July 31, 1962 J. MARCO 3,047,368
COMBINED MIXER, REACTOR AND DEAERATOR FOR CHEMICAL PROCESSES
Filed Feb. 20, 1961 4 Sheets-Sheet 1

Fig. 1

MATERIAL INLET

INVENTOR
John Marco
BY Jacobi & Jacobi
ATTORNEYS

July 31, 1962 J. MARCO 3,047,368
COMBINED MIXER, REACTOR AND DEAERATOR FOR CHEMICAL PROCESSES
Filed Feb. 20, 1961 4 Sheets-Sheet 2

INVENTOR
John Marco
BY
ATTORNEYS

July 31, 1962 J. MARCO 3,047,368
COMBINED MIXER, REACTOR AND DEAERATOR FOR CHEMICAL PROCESSES
Filed Feb. 20, 1961 4 Sheets-Sheet 4

INVENTOR
John Marco
BY
Jacobi & Jacobi
ATTORNEYS

United States Patent Office 3,047,368
Patented July 31, 1962

3,047,368
COMBINED MIXER, REACTOR AND DEAERATOR
FOR CHEMICAL PROCESSES
John Marco, Earleville, Md.
Filed Feb. 20, 1961, Ser. No. 90,310
16 Claims. (Cl. 23—252)

This invention relates to chemical apparatus and more particularly to a unitary apparatus for facilitating continuous reactions, heat exchange, mixing, cooking and other chemical processes, together with deaeration of the material flowing through the apparatus and in which it is necessary to maintain accurate and continuous control of the product during such processes, in which it is also advantageous to be able to add or withdraw heat at various stages of the process and also if desired, to introduce one or more additives at various stages of the process.

Heretofore numerous types of continuous reactors have been proposed and utilized, but many of these were unsatisfactory due to the inability to maintain accurate heat control at various stages of the process and in many of these machines short circuiting and harboring of the product in isolated locations resulted in an inferior product. Also these prior art machines permit the introduction of one or more additives at one or more desired stages of the process and furthermore, in many types of reactions, gaseous fumes are liberated which must be removed and these prior art machines did not provide suitable means for removing such gases.

As an example, the apparatus of this invention may be utilized in processes involving alkylation, cyclization, modulation, esterification, saponification, oxidation, polymerization, co-polymerization, fusions, acetylations, sulfanations and numerous other chemical processes, it being only necessary to operate the apparatus and the controls provided therefor in such a manner as to properly carry out these processes. While the apparatus of this invention is primarily intended to provide a unitary combined mixer, reactor and deaerator, nevertheless, various combinations thereof may be provided, such as a mixer and deaerator, a reactor and deaerator or, if desired, merely a deaerator utilizing the principles of this invention.

It is accordingly an object of the invention to provide a unitary combined mixer, reactor and deaerator for chemical processes and utilizing a single common drive shaft.

A further object of the invention is the provision of a chemical apparatus in which the product is mixed and treated in a succession of chambers in which the product is exposed to heat exchange surfaces in relatively thin film, thereby promoting extremely rapid heat exchange.

A still further object of the invention is the provision of a chemical apparatus in which additives may be incorporated in the product during any desired phase of the process.

Another object of the invention is the provision of chemical apparatus for continuous reactions and the like and in which all possibility of fouling or short circuiting of the product during reaction and during any other phase of the process is eliminated.

A still further object of the invention is the provision of a combined mixer, reactor and deaerator for chemical processes, such apparatus utilizing a plurality of chambers with an impeller disposed in each chamber, the impellers in one group of chambers serving to thoroughly mix the product flowing therethrough, the impellers in another group of chambers serving to agitate the product and maintain the same in contact with the walls of the chamber in a thin film to promote rapid heat exchange during the reaction phase of the process and the impellers in a third group of chambers serving to remove air or gases from the product and to expel such gases therefrom while, at the same time, discharging the product from the latter group of chambers, the impellers in all of the chambers in addition to the functions mentioned above also operating as pumps for promoting product flow through the apparatus.

A further object of the invention is the provision of chemical apparatus for continuous reactions and other chemical processes utilizing a plurality of chambers with an impeller disposed in each chamber and a common drive shaft for the impellers with such shaft being provided with a polygonal cross section to engage polygonal apertures in the impellers to drive the same thereby eliminating keyways which eliminates the harboring of portions of the product at various locations in the apparatus.

Another object of the invention is the provision of a combined mixer, reactor and deaerator for chemical processes and including a plurality of chambers and an impeller disposed in each chamber and in which heat may be either added or withdrawn from the walls of each chamber independently of any other chambers thereby accurately controlling the temperature conditions of the product in that chamber, as well as in all chambers throughout the entire process.

A further object of the invention is the provision of a combined mixer, reactor and deaerator for chemical processes, such apparatus including a plurality of chambers with impellers disposed in such chambers and in which such impellers provide a pumping action to move the product through the apparatus and in which such impellers may operate as metering means for determining the quality of product being processed.

A still further object of the invention is the provision of a combined mixer, reactor and deaerator for chemical processes, the reactor portion of the apparatus including a plurality of chambers with impellers disposed in each chamber and with the walls of the chambers acting as heat exchange surfaces, the impellers being so formed as to move the product outwardly along one wall in a thin film and inwardly along the opposite wall in a thin film in order to facilitate heat transfer.

Another object of the invention is the provision of a combined mixer, reactor and deaerator for chemical processes in which the deaerator portion of the apparatus includes a plurality of chambers with impellers disposed in each chamber, the outer portion of each impeller being formed to provide a centrifugal pump for urging the product outwardly of the chambers and through product flow passes in the wall of the chambers and in which the inner portions of the impellers are formed to provide centripetal pumps for moving air or gases liberated from the product inwardly of the chambers and through an air flow passage centrally of the walls of the chamber and outwardly to an air discharge outlet.

A further object of the invention is the provision of a combined mixer, reactor and deaerator for chemical processes in which the deaerating portion of the apparatus is provided with a plurality of chambers with impellers disposed in each chamber, such impellers being formed to provide at the outer portion thereof a centrifugal pump, at the inner portion a centripetal pump in order to facilitate the separation of air and gases from the product, the product being urged through product flow passages to a product discharge outlet and the air or gases being urged through air flow passages to an air discharge outlet there being also provided an additional fan type impeller disposed in the air flow passage to facilitate the flow of air through the apparatus and to the air discharge outlet.

A still further object of the invention is the provision of a combined mixer, reactor and deaerator for chemical processes, which apparatus may be constructed in any desired size or capacity or if desired, may be constructed of relatively small size for laboratory use and thereafter reproduced to a larger scale for production use.

Another object of the invention is the provision of a combined mixer, reactor and deaerator for chemical processes, which apparatus may be conveniently disassembled for cleaning or repair.

Further objects and advantages of the invention will be apparent from the following description taken in conjunction with the accompanying drawings wherein.

Figure 1:
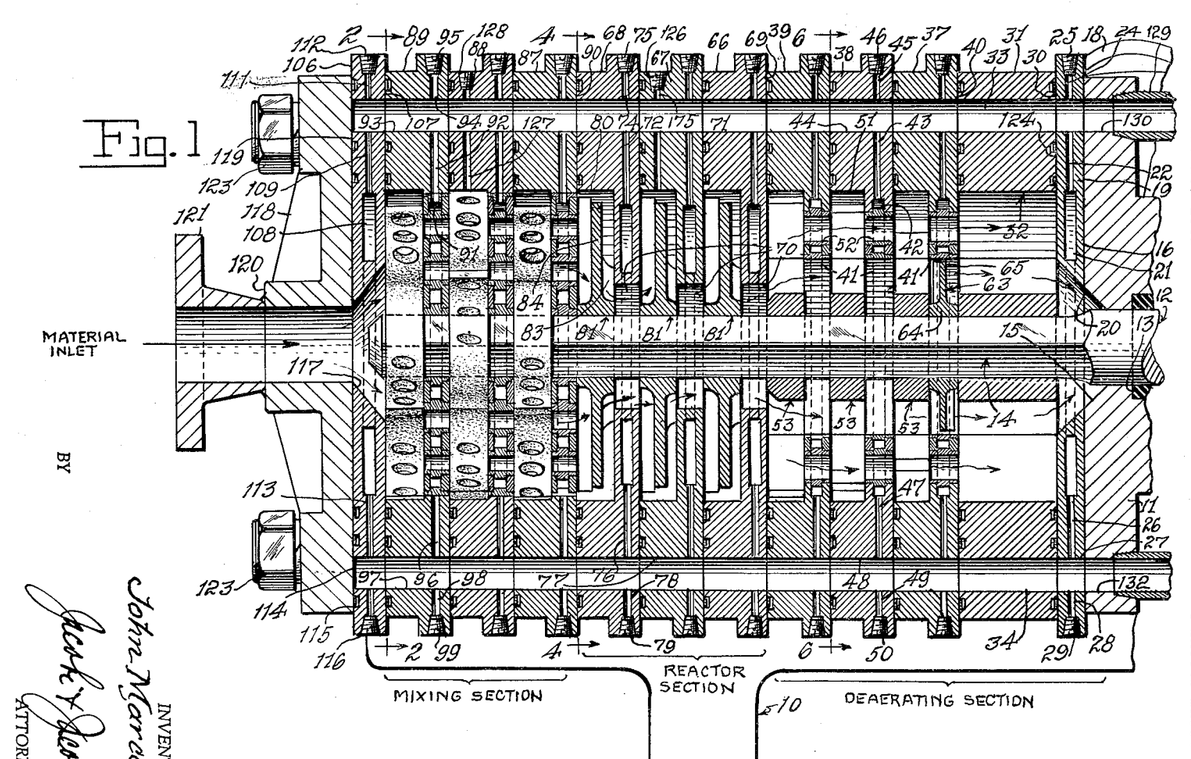
FIG. 1 is a longitudinal sectional view of a combined mixer, reactor and deaerator constructed in accordance with this invention.

With continued reference to the drawings and particularly FIG. 1, there is shown a combined mixer, reactor and deaerator for chemical processes constructed in accordance with this invention and which may well comprise a base or frame 10 having a flange 11 providing an inner end plate, there being an impeller drive shaft 12 rotatably mounted in the end plate 11 and provided with a suitable seal 13 to prevent leakage around the shaft. The shaft projects axially from the end plate 11 and the projecting portion 14 of the shaft 12 is provided with a continuous polygonal cross section, the purpose of which will be later described.

Figure 6:
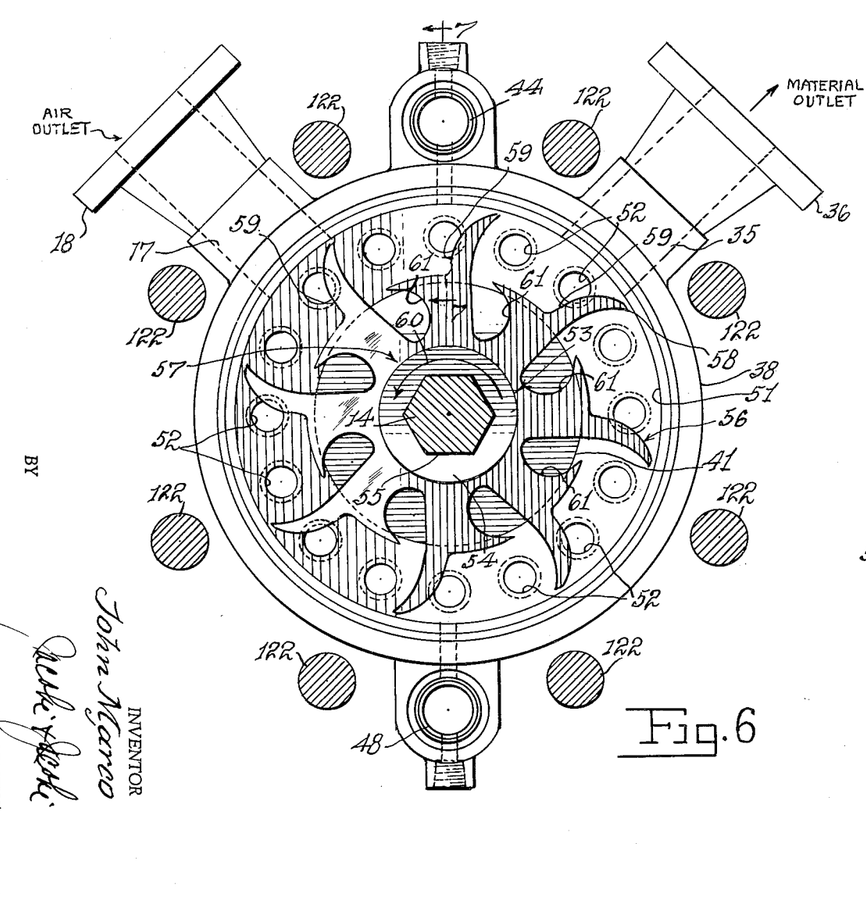
FIG. 6 a sectional view taken substantially on the line 6—6 of FIG. 1 and showing one of the impeller receiving chambers of the deaerator section of the apparatus, together with an impeller disposed in such chamber and the specific structure of such impeller, as well as the air or gas outlet and the product or material outlet from the apparatus.

The end plate 11 is provided with an annular recess 15 in the outer end face 16 thereof, the annular recess 15 surrounding the shaft 12 and communicating with an air or gas discharge passage 17 in the end plate 11, the air or gas discharge passage 17 terminating in a flange 18, as shown in FIG. 6, which provides an air or gas outlet connection.

The heat exchange plate 19 abuts the outer end face 16 of the end plate 11 and the heat exchange plate 19 is provided with an inner annular opening 20 surrounding the shaft 12 and communicating with the recess 15 in the end plate 11. The heat exchange plate 19 is provided with a passage 21 for receiving a heat exchange medium and the passage 21 communicates through a passage 22 with an aperture 23 in the plate 19 and also with a passage 24 which may be normally closed by a screw threaded plug or the like 25. The heat exchange medium receiving passage 21 also communicates through a passage 26 with an aperture 27 in the plate 19 and with a passage 28 normally closed by a screw threaded plug or the like 29.

Abutting the outer end face 30 of the heat exchange plate 19 is a spacing ring 31 which is concentric with the projecting portion 14 of the shaft 12 to provide an impeller receiving chamber 32 communicating with the opening 20 in the heat exchange plate 19 and the annular recess 15 in the end plate 11. The spacing ring 31 is provided with an aperture 33 extending therethrough in alignment with the aperture 23 in the heat exchange plate 19 and also with an aperture 34 extending therethrough and in alignment with the aperture 27 in the heat exchange plate 19. The spacing ring 31 is also provided with a material or product discharge passage 35 which communicates with the impeller chamber 32 at the periphery thereof and the discharge passage 35 terminates in a flange 36 providing a connection for conducting the material or product away from the apparatus upon completing the processing thereof.

The apparatus of this invention includes a deaerating section comprising a series of axially disposed heat exchange plates 37, 38 and 39 with the inner plate 37 abutting the outer end surface 40 of the spacing ring 31. Since the heat exchange plates 37, 38 and 39 are all identical, a description of one will suffice for all and it should be noted that though the deaerating section is shown as comprising the three heat exchange plates 37, 38 and 39, as well as the spacing ring 31, it is to be understood that this is for illustrative purposes only and that the deaerating section may be made up of any desired number of heat exchange plates in order to provide the proper capacity or other operating characteristics.

The heat exchange plates 37, 38 and 39 surround the projecting portion 14 of the shaft 12 in spaced concentric relationship to provide an axially extending air flow passage 41 through each plate 37, 38 and 39 communicating with the chamber 32 provided by the spacing ring 31. While the passage 41 has been referred to as an air flow passage, it is to be understood that this also contemplates the flow of other gases therethrough and hereafter it is to be understood that the term "air" is utilized as a generic term incorporating air as well as other gases.

The heat exchange plate 38 is provided with a passage 42 for receiving a heat exchange medium and such passage 42 communicates through a passage 43 with an aperture 44 extending through the plate 38 in alignment with a similar aperture in the plates 37 and 39, as well as in alignment with the aperture 33 in the spacing ring 31. The passage 43 also communicates with a passage 45 which may normally be closed by a screw threaded plug 46 or other suitable means. The heat exchange medium receiving passage 42 also communicates through a passage 47 with an aperture 48 extending through the plate 38 in alignment with similar apertures in the plates 37 and 39 and also in alignment with the aperture 34 in the spacing ring 31 and the passage 47 also communicates with a passage 49 normally closed by a screw threaded plug or the like 50.

Figure 7:
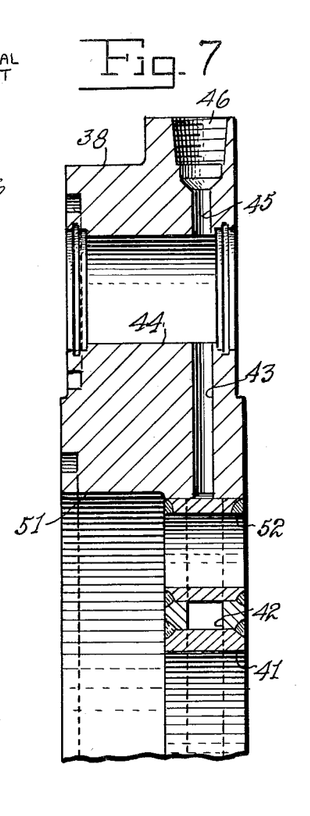
FIG. 7 a fragmentary sectional view taken substantially on the line 7—7 of FIG. 6 and showing the details of one of the heat exchange plates utilized in the deaerator section of the apparatus of this invention.

The heat exchange plate 38, as well as the heat exchange plates 37 and 39, are each provided with an annular recess surrounding the projecting portion 14 of the shaft 12 in concentric relationship to provide an impeller receiving chamber 51 and as best shown in FIGS. 6 and 7, the heat exchange plate 38, as well as the plates 37 and 39 are each provided with a circular series of axially extending apertures 52 adjacent the periphery of the chamber 51, as clearly shown in FIG. 7, to provide material or product flow passages between the chambers 51. An impeller 53 is disposed in each chamber 51 and as best shown in FIG. 6, the impeller 53 comprises a hub 54 having a polygonal aperture 55 therein for receiving and engaging the polygonal projecting portion 14 of the shaft 12 to provide a driving connection therebetween. A plurality of blades 56 extend radially from the hub 54 and each blade is provided with a relatively wide inner portion 57 and a relatively narrow outer portion 58. The leading face 59 of the outer portion 58 is curved in a direction away from the direction of rotation of the impeller 53, as indicated by the arrow 60 in FIG. 6, and the leading face 61 of the inner portion 57 is curved in a direction toward the direction of rotation as clearly shown in FIG. 6. This structure serves to provide a relatively large pocket between the leading face 59 of one blade 58 and the trailing face 62 of the next blade, this relatively large pocket being disposed in the outer portion of the impeller 53 and as will clearly be seen from an inspection of FIG. 6, the relatively wide inner portion 57 serves to provide a relatively small pocket between the leading face 61 of one blade and the trailing face 62 of the next blade. It is to be noted, that the relatively large pocket provided by the outer portions of the blades 56 is substantially opposite the circular series of apertures 52 providing the material or product flow passage and that the relatively small pockets provided by the inner portions of the blades 56 are in alignment with the air or gas flow passage 41. Also by reason of the curvature of the leading faces 59 of the outer portions of the blades 56, such portion provides a centrifugal pump for moving material in the chamber 51 radially outwardly thereof and through the material flow passages 52 and the curvature of the leading face 61 of the inner portions of the blades 56 provides a centripetal pump for moving air or other gases radially inwardly of the chamber 51 and through the air flow passage 41.

The operation of the impellers 53 in the chambers 51 of the deaerating section serves to violently agitate the material flowing therethrough in such a manner as to facilitate liberation of air or other gases therefrom and since the heavier product or material is moved radially outwardly in the chambers 51, the centripetal pumping action of the impellers serves to create a partial vacuum at the center of the chambers 51 thereby causing the air or gases to move radially inwardly and through the air flow passage 41 to the air discharge passage 17. In this manner, efficient deaeration of the material flowing through the deaerating section is obtained and, of course, proper temperature control in this section may also be obtained by provision of a heat exchange medium in the heat exchange medium receiving passages of the plates 37, 38 and 39, such medium, of course, being at the desired temperature.

In order to further facilitate flow of air through the air flow passage 41 as shown in FIG. 1, a fan type impeller 63 may be disposed in one of the passages 41 in one of the plates 37, 38 or 39, but preferably in the plate 37 as shown in FIG. 1, and such impeller 63 may comprise a hub 64 having a polygonal aperture for receiving and engaging the projecting polygonal portion 14 of the shaft 12 to provide a driving connection therebetween and a plurality of fan type blades 65 extending radially from the hub 64 within the passage 41 whereby rotation of the impeller 63 will operate to accelerate the flow of air through the passage 41 and into the chamber 32 from which the same flows through the opening 20 and recess 15 in the end plate 11 to the air discharge passage 17.

Figure 4:
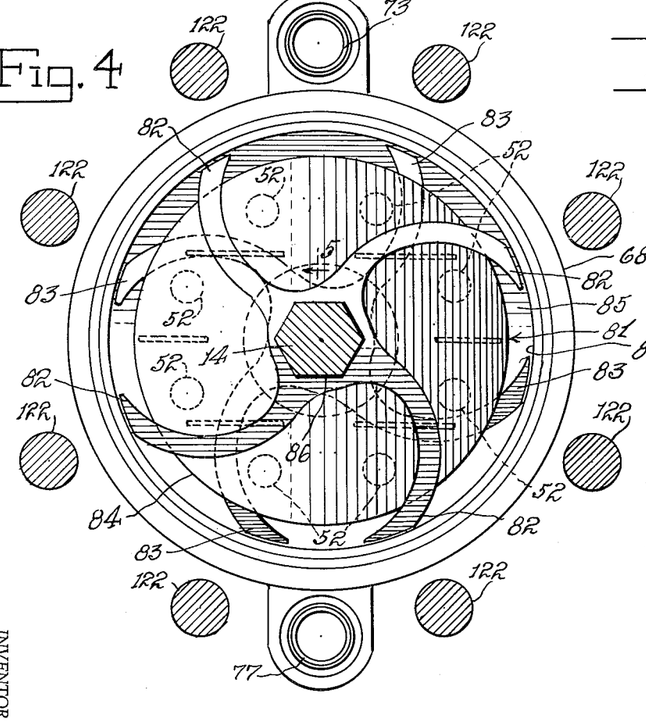
FIG. 4 a sectional view taken substantially on the line 4—4 of FIG. 1 and showing one of the impeller receiving chambers of the reactor section of the apparatus, together with an impeller disposed therein and the specific structure of such impeller.
Figure 5:
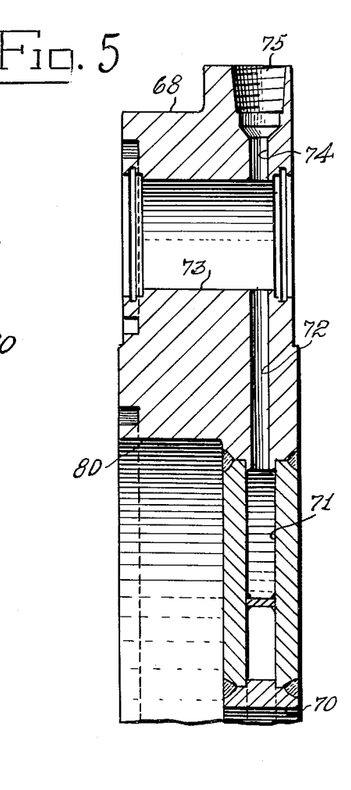
FIG. 5 a fragmentary sectional view taken substantially on the line 5—5 of FIG. 4 and showing the details of one of the heat exchange plates utilized in the reactor section of the apparatus of this invention.

With particular reference to FIGS. 1, 4 and 5, the apparatus of this invention includes a reactor section comprising a second series of axially disposed heat exchange plates 66, 67 and 68 with the heat exchange plate 66 abutting the outer end surface 69 of the heat exchange plate forming part of the deaerator section. The heat exchange plates 66, 67 and 68 surround the projecting portion 14 of the shaft 12 in spaced concentric relationship thereto to provide an axially extending flow passage 70 for material through the reactor section and into the deaerator section. While three heat exchange plates 66, 67 and 68 are shown as comprising the reactor section, it will be understood that this is for illustrative purposes only and that any desired number of such plates may be employed in order to provide sufficient capacity or to satisfy other requirements of the apparatus and also, since these plates are all identical in structure, a description of one will suffice for all and with particular reference to FIGS. 1, 4 and 5, the specific structure of heat exchange plate 68 will be described.

Heat exchange plate 68 is provided with a passage 71 for receiving a heat exchange medium and passage 71 communicates through a passage 72 with an aperture 73 extending through the plate 78 and also with a passage 74 which may be normally closed by a screw threaded plug or the like 75. As shown in FIG. 1, the aperture 73 in the plate 68 is in alignment with similar apertures in plates 66 and 67 which in turn are in alignment with the apertures 44 in plates 37, 38 and 39. The passage 71 for heat exchange medium also communicates through a passage 76 with an aperture 77 extending through the plate 68 and also with a passage 78 normally closed by a screw threaded plug or the like 79. The aperture 77 in the heat exchange plate 68 is in alignment with similar apertures in the plates 66 and 67 which in turn are in alignment with the apertures 48 in the plates 37, 38 and 39 of the deaerator section. The heat exchange plate 68 is further provided with an annular recess 80 disposed in concentric relationship with the projecting portion 14 of the shaft 12 to provide an impeller receiving chamber. Of course, there are similar impeller receiving chambers provided in the heat exchange plates 66 and 67.

An impeller 81 is disposed in the chambers 80 of the heat exchange plates 66, 67 and 68 comprising the reactor section of the apparatus and with particular reference to FIGS. 1 and 4, it will be seen that the impeller 81 comprises of a set of radially extending vanes 82 curved in one direction and a second set of radially extending vanes 83 curved in the opposite direction. The vanes 82 and 83 are separated by a disk 84 and it is to be noted that the diameter of the disk 84 is materially less than the diameters of the vanes 82 and 83 in order to provide a material passage 85 from one side of the disk 84 to the other. Centrally of the impeller 81 there is provided a polygonal aperture 86 for slidably and non-rotatably mounting the impellers 81 on the polygonal portion 14 of the shaft 12 as clearly shown in FIG. 4. As shown in FIG. 1, material on the left hand side of the disk 84 is engaged by the vanes 82 which are curved in a direction away from the direction of rotation of the impeller 81 and consequently, these vanes 82 provided a centrifugal action which forces material radially outwardly of the chamber 80 and causes the same to move through the passage 85 around the periphery of the disk 84 where such material is engaged by the vanes 83 which are curved in a direction toward the direction of rotation of the impeller 81 to provide a centripetal pumping action to move the material radially inwardly of the chamber 80 and through the material flow passage 70 to the next impeller chamber.

It is also to be noted that the vanes 82 and 83 of the impeller 81 engage the sidewalls of the impeller chamber 80 with a wiping contact which results in the material being spread in a thin film over the surfaces of the heat exchange plates in order to facilitate a rapid transfer of heat between the heat exchange plates and the material in the impeller chambers. Due to the flow of the material in a thin film along the opposite faces of each impeller chamber, the temperature of the material in that chamber may be accurately controlled as desired and furthermore, it will be noted that the impellers disposed in the impeller chambers 80 act to thoroughly agitate and mix the material and at the same time operate as pump impellers in order to move the material through the reactor section and since the amount of material moved therethrough is determined by the speed of operation of the impellers 81, such impellers operate as metering devices in order to control the quantity of material handled by the apparatus.

Figures 2, 3:
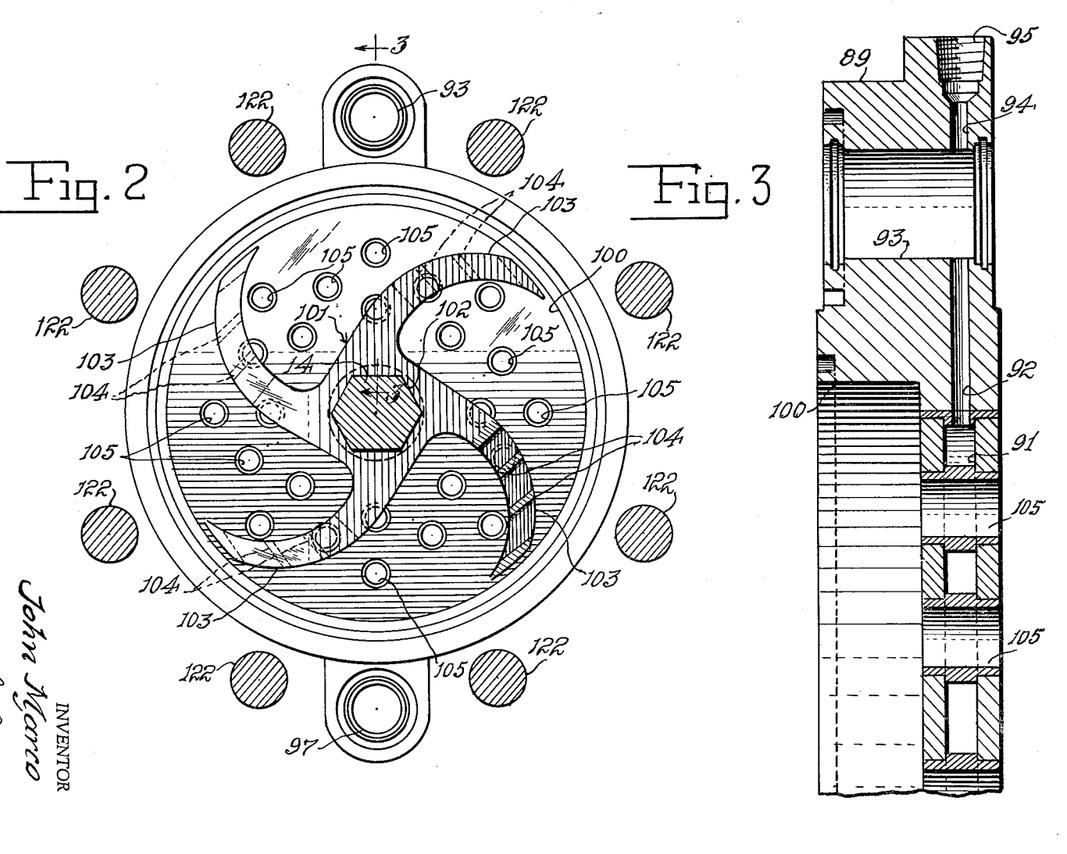
FIG. 2 a sectional view taken substantially on the line 2—2 of FIG. 1 and showing one of the impeller chambers of the mixer section with an impeller disposed therein, together with the specific structure of such impeller.
FIG. 3 a fragmentary sectional view taken substantially on the line 3—3 of FIG. 2 and showing the details of one of the heat exchange plates utilized in the mixer section of the apparatus of this invention.

The apparatus of this invention also includes a mixer section and as will be seen from an inspection of FIGS. 1, 2 and 3, such mixer section comprises a third series of axially disposed heat exchange plates 87, 88 and 89 with the plate 87 abutting the outer end surface 90 of the outer heat exchange plate 68 of the reactor section. The heat exchange plates 87, 88 and 89 surround the projecting portion 14 of the shaft 12 in closely spaced concentric relationship and while only three heat exchange plates 87, 88 and 89 are shown in the drawing, it is to be understood that this is for illustrative purposes only and that any desired number of such plates may be employed in order to provide the desired capacity or to satisfy any other requirements and since the heat exchange plates 87, 88 and 89 are identical in structure, a description of one will suffice for all and a description of heat exchange plate 89 will now be given with particular reference to FIGS. 1, 2 and 3.

Heat exchange plate 89 is provided with a passage 91 for receiving a heat exchange medium and passage 91 communicates through a passage 92 with an aperture 93 extending through the plate 89 and also with a passage 94 normally closed by a screw threaded or other suitable plug 95. In a similar manner, passage 91 also communicates with a passage 96 communicating with an aperture 97 extending through the plate 89 and also with a passage 98 normally closed by a screw threaded plug or the like 99. It will also be noted from an inspection of FIG. 1, that the aperture 93 is in alignment with similar apertures in the heat exchange plates 87 and 88 which in turn are in alignment with the apertures 73 in the plates of the reactor section and in alignment with the apertures 44 of the plates in the deaerator section. The apertures 97 in the plates 87, 88 and 89 are in alignment with the apertures 77 in the plates comprising the reactor section and also in alignment with the apertures 48 in the plates comprising the deaerator section.

The plate 89, as well as the plates 87 and 88 comprising the mixer section is provided with an annular recess 100 which is concentric with the projecting portion 14 of the shaft 12 and provides an impeller receiving chamber. An impeller 101 is disposed in the chamber 100 and as best shown in FIGS. 1 and 2, the impeller 101 is provided with a central polygonal aperture 102 receiving the polygonal portion 14 of the shaft 12 to provide a driving connection for the impeller 101. The impeller 101 is provided with a plurality of radially extending vanes 103 and it is to be noted that the vanes 103 are curved in a direction opposite to the direction of rotation of the impeller 101 in order to provide a centrifugal pumping action. In order to facilitate mixing of material in the chambers 100, each of the vanes 103 is provided with a plurality of radially spaced apertures 104 which serves to provide a thorough mixing of the material flowing through the mixer section. The vanes 103 of the impeller 101 engage the sidewalls of the chamber 100 with a wiping action in order to provide a relatively thin film of material on the walls thereby facilitating the transfer of heat between the material and the heat exchange plates. Each of the heat exchange plates 87, 88 and 89 are provided with a plurality of axially disposed apertures 105 which provide a flow passage for material through the mixer section and into the reactor section.

A heat exchange plate 106 abuts the outer surface 107 of the heat exchange plate 89 of the mixer section and the heat exchange plate 106 is provided with a passage 108 therein for receiving a heat exchange medium and the passage 108 communicates with a passage 109 and an aperture 110 extending through the plate 106. The passage 109 also communicates with a passage 111 which is normally closed by a screw threaded plug or the like 112.

In a similar manner, the heat exchange medium receiving passage 108 in the heat exchange plate 106 communicates with a passage 113 and an aperture 114 extending through the plate 106 and also with a passage 115 normally closed by a screw threaded plug or the like 116. The heat exchange plate 106 is also provided with a central aperture 117 communicating with the chamber 100 in the heat exchange plate 89 of the mixer section and it is to be noted, that the outwardly projecting portion 14 of the shaft 12 terminates within the central aperture 117 in the heat exchange plate 106 to permit passage of material through the aperture 117 into the chamber 100 of the heat exchange plate 89.

An outer end plate 108 abuts the outer end surface 109 of the heat exchange plate 112 and the outer end plate 118 is provided with a material inlet passage 120 communicating with the aperture 117 in the heat exchange plate 112 and terminating in a flange 121 providing means for connecting a material supply conduit thereto.

The spacing ring 31, the heat exchange plates 37, 38 and 39 constituting the deaerating section, the heat exchange plates 66, 67 and 68 constituting the reactor section, the heat exchange plates 87, 88 and 89, as well as the heat exchange plate 19 and the heat exchange plate 106, together with the outer end plate 118 are all secured in assembled relationship with the inner end plate 11, by means of a plurality of longitudinally extending bolts or rods 122 secured to the end plate 11 or other portions of the frame 10 of the apparatus and being provided on the outer ends thereof with suitable screw threaded means, such as nuts 123 which serve to clamp all of the heat exchange plates, as well as the spacer ring 31 and end plates 11 and 118 in assembled fluid tight relationship. If desired, suitable packing or gasket means 124 may be provided on the abutting faces of the heat exchange plates and spacing ring 31 in order to prevent leakage of material or air between the plates.

In certain chemical processes which may be carried out in the apparatus of this invention, it is highly desirable to introduce additives of a desired nature at one or more stages in the process and for this purpose, there may be provided in the heat exchange plate 67 of the reactor section a passage 125 communicating with the chamber 80, the passage 125 being normally closed by a screw threaded or other suitable plug 126. In a similar manner, the heat exchange plate 88 of the mixer section may be provided with a passage 127 communicating with the chamber 100 and the passage 127 may normally close by a screw threaded or other suitable plug 128. While passages 125 and 127 have been shown as provided for introducing additives into one chamber of the reactor section or mixer section, it is to be understood that this is for illustrative purposes only and that such passages may be provided for each chamber and if desired, such passages could also be provided for the chambers of the deaerating section.

As best shown in FIG. 1, a conduit 129 may be connected to an aperture 130 in the inner end plate 11 and the aperture 130 is in alignment with the aperture 23 in the heat exchange plate 19, as well as being in alignment with the aperture 33 of the spacing ring 31, the apertures 44 of the exchange plates 37, 38 and 39 of the deaerating section, the apertures 73 of the plates 66, 67 and 68 of the reactor section and the apertures 93 of the plates 87, 88 and 89 of the mixer section and the aperture 110 of the heat exchange plate 106. This serves to provide a manifold for introducing or discharging heating medium from the heating medium passages of the various heat exchange plates. In a similar manner, a conduit 131 may be connected to an aperture 132 in the inner end plate 11 and the aperture 132 is in alignment with the aperture 27 in the heat exchange plate 19, as well as the aperture 34 in the spacing ring 31, the apertures 48 in the heat exchange plates 37, 38 and 39 of the deaerating section, the apertures 77 in the heat exchange plates 66, 67 and 68 of the reactor section, the apertures 97 of the heat exchange plates 87, 88 and 89 of the mixer section and the aperture 114 of the heat exchange plate 112. This serves to provide a manifold for introducing or discharging from the heat exchanging medium from the heat exchange passages of the heat exchange plate.

In operation and assuming the shaft 12 to be rotating to drive all of the impellers, material to be processed is introduced through the material inlet passage 120 and through the aperture 117 in the heat exchange plate 106 into the chamber 100 of the heat exchange plate 89 of the mixer section. The impeller 101 in the chamber 100 serves to thoroughly mix the material by reason of the structure of the impeller and also to cause contact of the material in a thin film with the walls of the chamber 100 in order to facilitate heat transfer between the material and the walls of the chamber. Since the impeller 101 operates as a centrifugal pump, the material will be forced through the flow passages 105 to the succeeding chambers of the mixer section and from the last chamber of the mixer section, the material will flow through the flow passages 105 into the chamber 80 of the reactor section. In the reactor section, the material is engaged by the vanes 82 of the impeller 81 to move the material in a thin film along one wall of the chamber 80 and around the outer circumference of the disk 84 of the impeller 81 and inwardly along the opposite wall of the chamber 80 in a thin film to facilitate transfer of heat between the material and the walls of the chamber 80. Since the vanes 83 of the impeller 81 operate as a centripetal pump, the material will be forced inwardly of the chamber 80 and through the flow passages 70 to succeeding chambers and from the last chamber of the reactor section into the chamber 51 of the deaerating section. In the deaerating section, the material is moved outwardly by reason of the centrifugal pumping action of the outer portions of the blades 58 of the impeller 56 and the air or gases entrained in the material or separated therefrom will be moved inwardly in the chamber 51 by reason of the centripetal pumping action of the inner portion of the blades 58 of the impeller 56. As a result of this action, the material will be forced through the material flow passages 52 to the various chambers of the deaerating section and through the material discharge passage 35 in the spacing ring 31. In a similar manner, the air or other gases will be forced through the air flow passages 41 between the various chambers of the deaerating section and such flow will be accelerated by the fan type impeller 63 with the air or other gases being discharged from the chamber 32 formed by the spacing ring 31 through the annular recess 15 in the end plate 11 and the air or gas discharge passage 17 in the inner end plate 11. In this manner, the material leaving the apparatus will be free of air or gases, the elimination of which has heretofore been troublesome.

It will be seen that by the above described invention there has been provided a chemical apparatus which may be conveniently utilized for thorough and appropriate mixing of materials for a continuous reaction involving such materials and for deaerating the material subsequent to the reaction stage of the process, the material being discharged through one passage and the air or gases through another passage and furthermore, the process may be carried out under accurately controlled temperature conditions at any stage of the process and likewise, additives may be introduced at any desired stage of the process. Furthermore, the apparatus of this invention may be manufactured in any desired size or capacity and may be conveniently disassembled for cleaning or repair purposes and the structure is such that short circuiting or harboring of the material in any specific location is substantially prevented thereby contributing to the production of a uniform and high quality product.

It will be obvious to those skilled in the art that various changes may be made in the invention without departing from the spirit and the scope thereof and therefore the invention is not limited by that which is shown in the drawings and described in the specification, but only as indicated in the appended claims.

What is claimed is:

1. A chemical apparatus providing a combined mixer, reactor and deaerator, said apparatus comprising a frame having a flange providing an inner end plate, an impeller drive shaft rotatably mounted in said end plate and projecting axially therefrom, the projecting portion of said shaft having a continuous polygonal cross section, an annular recess in the outer end face of said end plate surrounding said shaft, an air discharge passage in said end plate communicating with said recess, a heat exchange plate abutting the outer end surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section providing a series of axially disposed heat exchange plates abutting the outer end surface of said spacing ring and surrounding said shaft in spaced concentric relationship to an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between each of said chambers, an impeller disposed in each chamber, each impeller having a polygonal aperture receiving said shaft to provide a driving connection, a plurality of radially extending blades on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passages to said air discharge passage, a reactor section comprising a second series of axially disposed heat exchange plates abutting the outer end surace of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in each of said last named chambers, each of said last named impellers having a polygonal aperture receiving said shaft to provide a driving connection, each of said last named impellers comprising a set of radially extending vanes curved in one direction and engaging one sidewall of the associated chamber with a wiping contact, a second set of radially extending vanes curved in the opposite direction and engaging the opposite sidewall of the associated chamber with a wiping contact and a disk separating said first and second sets of vanes, the outer diameter of said disk being less than the outer diameters of said set of vanes to provide a material passage between opposite sides of said disk, a mixer section comprising a third series of axially disposed exchange plates abutting the outer end surface of said second series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers, each of said last named impellers having a polygonal aperture receiving said shaft to provide a driving connection, each of said last named impellers comprising a plurality of radially extending vanes curved in one direction and engaging the sidewalls of said last named chambers with a wiping contact, each of said last named vanes having a plurality of radially spaced apertures to provide a mixing action and each of said last named heat exchange plates having a plurality of axially disposed apertures providing a flow passage for material through said mixer section into said reactor section, a heat exchange plate abutting the outer surface of said mixer section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said mixer section through the aperture in said last named heat exchange plate.

2. A chemical apparatus as defined in claim 1 in which a fan type impeller driven by said shaft is disposed in said air flow passage to facilitate the flow of air from said deaerating section.

3. A chemical apparatus as defined in claim 1, in which certain of said heat exchange plates are provided with an inlet passage communicating with the adjacent impeller chamber to permit introduction of a material additive to such chamber.

4. A chemical apparatus as defined in claim 1, in which each impeller in said deaerator section comprises a hub, a plurality of blades extending radially from said hub, each blade having a relatively wide inner portion and a relatively narrow outer portion, the leading face of said outer portion being curved in a direction away from the direction of rotation and the leading face of said inner portion being curved in a direction toward the direction of rotation to provide a combined radially separated centrifugal and centripetal pumping action.

5. A chemical apparatus providing a combined mixer, reactor and deaerator, said apparatus comprising a frame having a flange providing an end plate, an impeller drive shaft rotatably mounted in said end plate and projecting axially therefrom, an annular recess in the outer end surface of said end plate surrounding said shaft, an air discharge passage in said end plate communicating with said recess, a heat exchange plate abutting said outer end surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passages to said air discharge passage, a reactor section comprising a second series of axially disposed heat exchange plates abutting the outer end surface of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in each of said last named chambers and coupled to said shaft, each of said last named impellers comprising a set of radially extending vanes curved in one direction and engaging one sidewall of the associated chamber with a wiping contact, a second set of radially extending vanes curved in the opposite direction and engaging the opposite sidewall of the associated chamber with a wiping contact and a disk separating said first and second sets of vanes, the outer diameter of said disk being less than the outer diameters of said sets of vanes to provide a material passage between opposite sides of said disk, a mixer section comprising a third series of axially disposed heat exchange plates abutting the outer end surface of said second series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers and coupled to said shaft, each of said last named impellers comprising a plurality of radially extending vanes curved in one direction and engaging the sidewalls of said last named chambers with a wiping contact, each of said last named vanes having a plurality of radially spaced apertures to provide a mixing action and each of said last named heat exchange plates having a plurality of axially disposed apertures providing a flow passage for material through said mixer section into said reactor section, a heat exchange plate abutting the outer surface of said mixer section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said mixer section through the aperture in said last named heat exchange plate.

6. A chemical apparatus providing a combined mixer, reactor and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a heat exchange plate abutting the outer end surface of said end plate and having an inner annular opening surrounding said shaft in communication with said recess, a passage in said heat exchange plate for receiving said heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section comprising a series of axially disposed exchange plates abutting the outer end surface of said spacing ring and surrounding said shaft in spaced concentric relationship to provide an axially extending air flow passage communicating with said chamber, a passage in said last named heat exchange plate for receiving a heat exchange medium, an annular recess in said last named heat exchange plate providing an impeller receiving chamber, a circular series of axially extending apertures in each of said last named heat exchange plates adjacent the periphery of each of said last named recesses to provide material flow passages between said chambers, an impeller disposed in said chamber and coupled to said shaft, a plurality of radially extending blades on each impeller, the outer portion of the blade being formed to provide a centrifugal pump for forcing material radially outward of said chambers and through said material flow passages to said material discharge passage, the inner portion of each blade being formed to provide a centripetal pump for forcing air radially inward in said chambers and through said air flow passages to said air discharge passage, a reactor section comprising a second series of axially disposed heat exchange plates abutting the outer end surface of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in said last named chambers and coupled to said shaft, a mixer section comprising a series of axially disposed heat exchange plates abutting the outer end surface of said second series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers and coupled to said shaft, and each of said last named heat exchange plates having a plurality of axially disposed apertures providing a flow passage for materials through said mixer section into said reactor section, a heat exchange plate abutting the outer surface of said mixer section, a passage in said last named heat exchange plate for receiving a heat exchange medium, a central aperture at said last named heat exchange plate, an outer end plate abutting the outer surface of said last named heat exchange plate and a material inlet passage in said outer end plate communicating with said mixer section through the aperture in said last named heat exchange plate.

7. A chemical apparatus providing a combined reactor and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a heat exchange plate abutting the outer end surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section comprising a series of axially disposed exchange plates abutting the outer surface of said spacing ring and surrounding said shaft in spaced and concentric relationship to provide an axially extending air flow passage communicating with said chamber, a passage in said last named heat exchange plate for receiving a heat exchange medium, an annular recess in each of said last named heat exchange plates providing an impeller receiving chamber, a circular series of axially extending apertures at each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centripetal pump for forcing material radially outward in said chambers and through said material flow passages to said material discharge passage, the inner portion of each blade being formed to provide a centrifugal pump for forcing air radially inward in said chambers and through said air flow passages to said air discharge passage, a reactor section comprising a second series of axially disposed exchange plates abutting the outer end surface of said first series and surrounding said shaft in spaced concentric relationship to provide an axially extending flow passage for material to said reactor section and into said deaerator section, a passage in said last named heat exchange plate for receiving a heat exchange medium, an annular recess in said last named heat exchange plate providing an impeller receiving chamber, an impeller disposed in said last named chambers and coupled to said shaft, each of said last named impellers comprising a set of radially extending vanes curved in one direction and engaging one sidewall of the associated chamber with a wiping contact, a second set of radially extending vanes curved in the opposite direction and engaging the opposite sidewall of the associated chamber with a wiping contact and a disk separating said first and second sets of vanes, the outer diameter of said disk is less than the outer diameters of said sets of vanes to provide a material passage between opposite sides of said disk, a heat exchange plate abutting the outer surface of said reactor section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said reactor section through the aperture in said last named heat exchange plate.

8. A chemical apparatus providing a combined mixer and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a heat exchange plate abutting the outer end surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centrifugal pump for forcing material radially outward in said chambers and through said material flow passages to said material discharge passage, the inner portion of each blade to provide a centripetal pump for forcing air radially inward in said chambers and through said air flow passages to said air discharge passage, a mixer section comprising a second series of axially disposed heat exchange plates abutting the outer end surface of said first series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers and coupled to said shaft, each of said last named impellers comprising a plurality of radially extending vanes curved in one direction and engaging the sidewalls of said last named chambers with a wiping contact, each of said last named vanes having a plurality of radially spaced apertures to provide a mixing action and each of said last named heat exchange plates having a plurality of axially disposed apertures providing a flow passage for material through said mixer section into said deaerator section, a heat exchange plate abutting the outer surface of said mixer section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said mixer section through the aperture in said last named heat exchange plate.

9. A chemical apparatus as defined in claim 7, in which certain of said heat exchange plates are provided with an inlet passage communicating with the adjacent impeller chamber to permit introduction of a material additive to such chamber.

10. A chemical apparatus as defined in claim 8 in which certain of said heat exchange plates are provided with an inlet passage communicating with the adjacent impeller chamber to permit introduction of a material additive to such chamber.

11. A chemical apparatus providing a deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a heat exchange plate abutting the outer end surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passages to said air discharge passage, a heat exchange plate abutting the outer surface of said deaerator section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said deaerator section through the aperture in said last named heat exchange plate.

12. A chemical apparatus as defined in claim 11, in which certain of said heat exchange plates are provided with an inlet passage communicating with the adjacent impeller chamber to permit introduction of a material additive to such chamber.

13. A chemical apparatus providing a combined mixer, reactor and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a heat exchange plate abutting the outer end surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said recess, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending plates on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passage to said air discharge passage, a reactor section comprising a second series of axially disposed heat exchange plates abutting the outer end surface of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in each of said last named chambers and coupling to said shaft, each of said last named impellers comprising a set of radially extending vanes curved in one direction and engaging one sidewall of the associated chamber with a wiping contact, a second set of radially extending vanes curved in the opposite direction and engaging the opposite sidewall of associated chamber with a wiping contact and a disk separating said first and second sets of vanes, the outer diameter of said disk being less than the outer diameters of said sets of vanes to provide a material passage between opposite sides of said disk, a mixer section comprising a third series of axially disposed heat exchange plates abutting the outer end surface of said second series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers and coupled to said shaft, each of said last named heat exchange plates having a plurality of axially disposed apertures providing a flow passage for material through said mixer section into said reactor section, a heat exchange plate abutting the outer surface of said mixer section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said mixer section through the aperture in said last named heat exchange plate.

14. A chemical apparatus providing a combined mixer, reactor and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a heat exchange plate abutting the outer surface of said end plate and having an inner annular opening surrounding said shaft in communication with said recess, a passage in said heat exchange plate for receiving a heat exchange medium, a spacing ring abutting the outer end surface of said heat exchange plate concentric with said shaft to provide an impeller receiving chamber communicating with said opening, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passages to said air discharge passage, a reactor section comprising a second series of axially disposed heat exchange plates abutting the outer end surface of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in each of said last named chambers and coupled to said shaft, a mixer section comprising a third series of axially disposed heat exchange plates abutting the outer end surface of said second series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers and coupled to said shaft, each of said last named impellers comprising a plurality of radially extending vanes curved in one direction and engaging the sidewalls of said last named chambers with a wiping contact, each of said last named vanes having a plurality of radially spaced apertures to provide a mixing action and each of said last named heat exchange plates having a plurality of axially disposed apertures providing a flow passage for material through said mixer section into said reactor section, a heat exchange plate abutting the outer surface of said mixer section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said mixer section through the aperture in said last named heat exchange plate.

15. A chemical apparatus providing a combined mixer, reactor and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a spacing ring abutting the outer end surface of said end plate concentric with said shaft to provide an impeller receiving chamber communicating with said recess, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passage to said air discharge passage, a reactor section comprising a second series of axially disposed heat exchange plates abutting the outer end surface of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in each of said last named chambers and coupled to said shaft, a mixer section comprising a third series of axially disposed heat exchange plates abutting the outer end surface of said second series and surrounding said shaft in closely spaced concentric relationship, a passage in each of said last named heat exchange plates for receiving a heat exchange medium, an annular recess in each of said last named heat exchange plates to provide an impeller receiving chamber, an impeller disposed in each of said last named chambers and coupled to said shaft and each of said last named heat exchange plates having a plurality of axially disposed apertures providing a flow passage for material through said mixer section into said reactor section, a heat exchange plate abutting the outer surface of said mixer section, a passage in said last named heat exchange plate for receiving a heat exchange medium, a central aperture in said last named heat exchange plate, an outer end plate abutting the outer surface of said last named heat exchange plate and a material inlet passage in said outer end plate communicating with said mixer section to the aperture in said last named heat exchange plate.

16. A chemical apparatus providing a combined mixer, reactor and deaerator, said apparatus comprising a frame having a flange providing an inner end plate, an impeller drive shaft rotatably mounted in said end plate and projecting axially therefrom, an annular recess in the outer end face of said end plate surrounding said shaft, an air discharge passage in said end plate communicating with said recess, a spacing ring abutting the outer end surface of said end plate concentric with said shaft to provide an impeller receiving chamber communicating with said recess, a material discharge passage in said ring communicating with said chamber at the periphery thereof, a deaerating section comprising a series of axially disposed heat exchange plates abutting the outer end surface of said spacing ring and surrounding said shaft in spaced concentric relationship to provide an axially extending air flow passage communicating with said chamber, a passage in each of said last named heat exchange plates for receiving a heat exchange medium, an annular recess in each of said last named heat exchange plates providing an impeller receiving chamber, a circular series of axially extending apertures in each of said last named heat exchange plates adjacent the periphery of each of said last named recesses to provide material flow passages between said chambers, an impeller disposed in each chamber and coupled to said shaft, a plurality of radially extending blades on each impeller, the outer portion of each blade being formed to provide a centrifugal pump for forcing material radially outward in said chambers and through said material flow passages to said material discharge passage, the inner portion of each blade being formed to provide a centripetal pump for forcing air radially inward in said chambers and through said air flow passages to said air discharge passage, a reactor section comprising a second series of axially disposed heat exchange plates abutting the outer end surface of said first series and surrounding said shaft in spaced concentric relationship to provide an axially extending flow passage for material through said reactor section and into said deaerator section, a passage in each of said last named heat exchange plates for receiving a heat exchange medium, an annular recess in each of said last named heat exchange plates providing an impeller receiving chamber, an impeller disposed in each of said last named chambers and coupled to said shaft, a mixer section comprising a third series of axially disposed heat exchange plates abutting the outer end surface of said second series and surrounding said shaft in closely spaced concentric relationship, a passage in each of said last named heat exchange plates for receiving a heat exchange medium, an annular recess in each of said last named heat exchange plates providing an impeller receiving chamber, an impeller disposed in each of said last named chambers and coupled to said shaft and each of said last named heat exchange plates having a plurality of axially disposed apertures providing a flow passage of material through said mixer section into said reactor section, an outer end plate abutting the outer surface of said mixer section and a material inlet passage in said outer end plate communicating with said mixer section.

No references cited.